United States Patent [19]

Zeilinger et al.

[11] 4,177,689
[45] Dec. 11, 1979

[54] CHAIN DRIVE, ESPECIALLY FOR THE CONTROL DRIVE OF INTERNAL COMBUSTION ENGINES

[75] Inventors: Karl Zeilinger, Berglen-Hösslinswart; Reiner Bachschmid, Stetten-Rommelshausen, both of Fed. Rep. of Germany

[73] Assignee: Daimler-Benz Aktiengesellschaft, Fed. Rep. of Germany

[21] Appl. No.: 857,693

[22] Filed: Dec. 5, 1977

[30] Foreign Application Priority Data

Dec. 4, 1976 [DE] Fed. Rep. of Germany ....... 2655102

[51] Int. Cl.² ............................ F16H 7/08; F16H 7/12
[52] U.S. Cl. ............................ 74/242.8; 74/242.1 R; 74/242.11 C; 123/90.31
[58] Field of Search ........... 74/242.8, 242.9, 242.11 C, 74/242.1 R, 242.11 R, 216.5, 242.1 FA, 242.1 FP; 123/90.31

[56] References Cited

U.S. PATENT DOCUMENTS

| 1,202,227 | 10/1916 | Sandifur | 74/242.11 R |
|---|---|---|---|
| 1,581,624 | 4/1926 | Wunderlich et al. | 123/90.31 |
| 1,605,962 | 11/1926 | Lovejoy | 74/242.1 R |
| 1,828,769 | 10/1931 | Duhamel | 74/242.9 |
| 1,892,067 | 12/1932 | McMillan | 123/90.31 |
| 1,982,299 | 11/1934 | Hapgood | 74/242.11 R |
| 2,010,056 | 8/1935 | Brush | 123/90.31 |
| 2,597,503 | 5/1952 | Larsson | 74/242.11 R |
| 3,252,347 | 5/1966 | Seaman | 74/242.8 |
| 3,888,217 | 6/1975 | Hisserich | 123/90.31 |

FOREIGN PATENT DOCUMENTS

| 269892 | 1/1949 | Fed. Rep. of Germany | 123/90.31 |
|---|---|---|---|
| 841839 | 7/1949 | Fed. Rep. of Germany | 74/216.5 |
| 1575619 | 1/1970 | Fed. Rep. of Germany | 74/242.9 |
| 2056280 | 5/1972 | Fed. Rep. of Germany | 74/242.11 C |
| 2655102 | 6/1978 | Fed. Rep. of Germany | 123/90.31 |

Primary Examiner—Samuel Scott
Assistant Examiner—William R. Henderson
Attorney, Agent, or Firm—Craig and Antonelli

[57] ABSTRACT

A chain drive, especially for the control drive of internal combustion engines with a tensioning member engaging at a non-loaded chain section. In addition to this tensioning member, a further tensioning member is provided which engages at another chain section and whose tensioning movement is derived from the first tensioning member.

16 Claims, 3 Drawing Figures

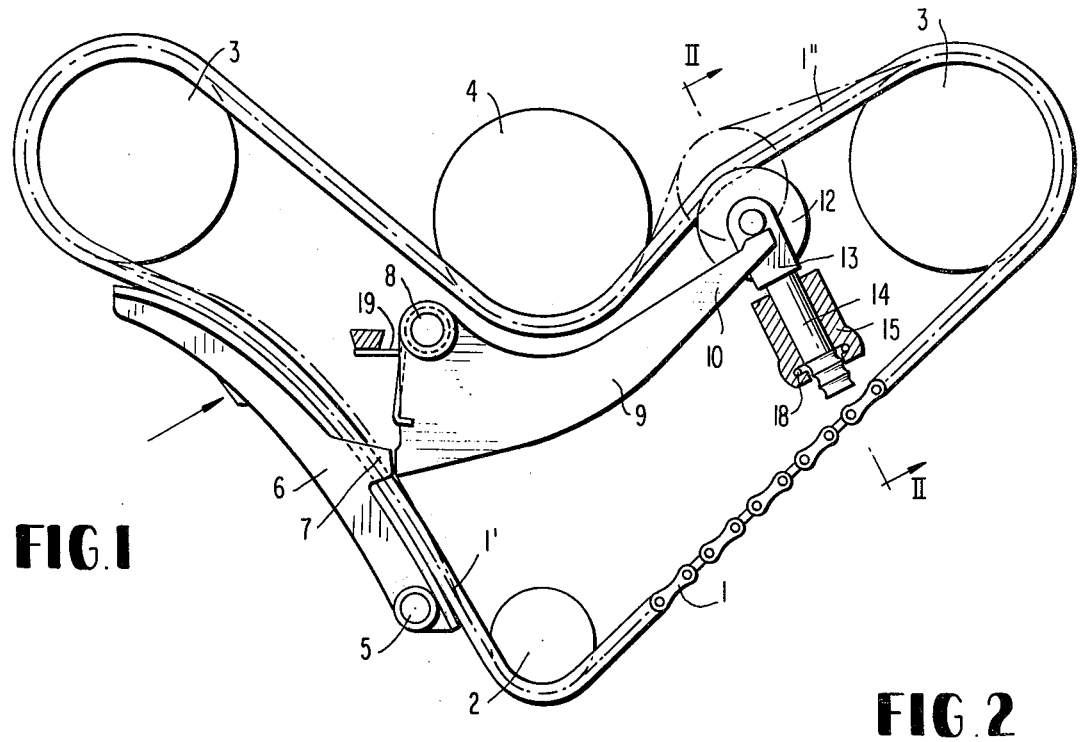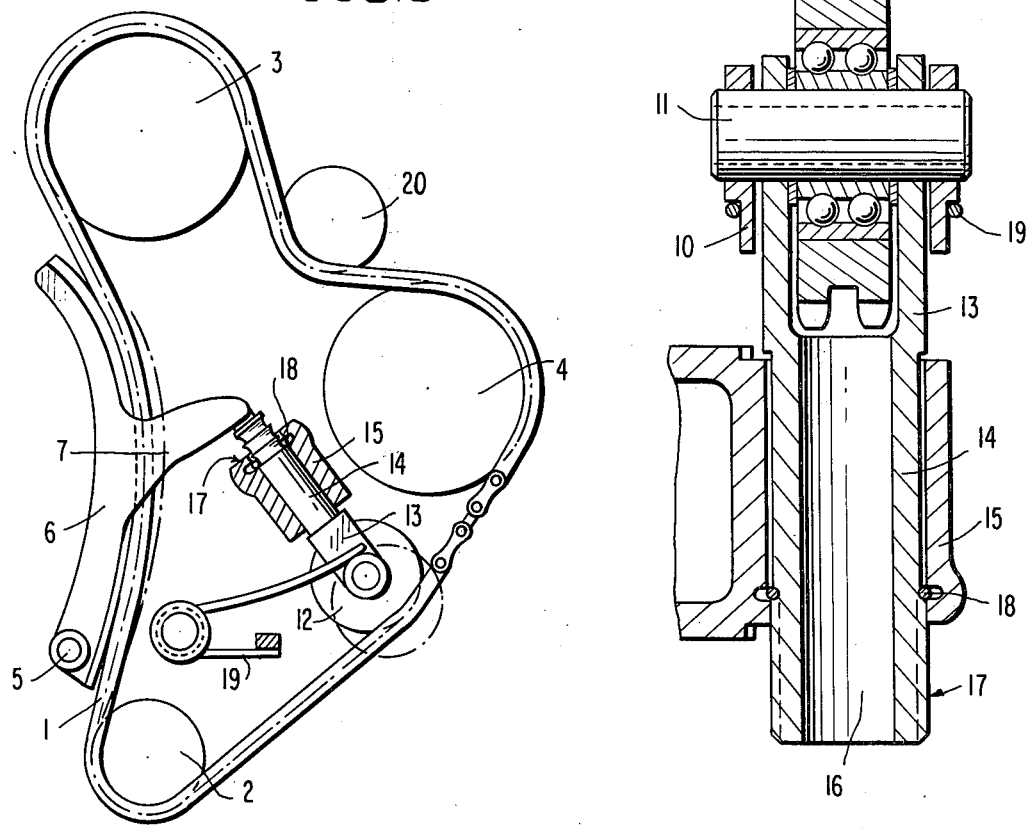

CHAIN DRIVE, ESPECIALLY FOR THE CONTROL DRIVE OF INTERNAL COMBUSTION ENGINES

The present invention relates to a chain drive, especially for the control actuation (timing control) of internal combustion engines, with a tensioning member engaging at a non-loaded chain section.

With internal combustion engines, a chain drive is generally provided for the drive of the cam shaft or shafts and of other auxiliary aggregates, in connection with which a synchronous rotational speed with respect to the crankshaft is of particular importance. Even though these chains are made of special steel, a lengthening which may amount up to 1%, cannot be precluded. This lengthening produces, especially with longer chains, an undesired change of the coordination of the aggregates driven by the crankshaft. In order to maintain the provided chain tension or tightness, a chain tensioning member is arranged in the prior art chain drives in the loose section of the chain, which as a rule is pressed against the chain by elastic means such as, for example, a spring force. However, these chain tensioning members which are held against the chain by an elastic force, yield with a jerk-like load and impact movements of the chain.

Furthermore, a chain tensioner for chains is known (German Pat. 958,070) which serves, for example, for the drive of the valve control shaft of an internal combustion engine. This chain tensioner consists of a piston adapted to be blocked against a return movement by means of locking pawls and locking teeth, whereby a head portion which is also under the effect of a spring, slides on the end of the piston projecting out of its cylinder guidance so that only the head portion follows the impact movements of the chain or of a part resting against the same, i.e., so that the head portion acts directly by itself on the tensioning parts. A changed chain geometry as a result of thermal expansion of the crankcase and cylinder head as well as oscillations of the chain prevent uniform control periods, as are necessary with internal combustion engines for the fulfillment of strict exhaust gas regulations.

It is the aim of the present invention to maintain as constant as possible, by a device in a chain drive, the coordination of the control periods of the valves and of the ignition or injection instant over the length of life of an internal combustion engine.

The underlying problems are solved according to the present invention in that in addition to a first tensioning member, a further tensioning member engaging at another chain section is provided whose tensioning movement is derived from the first tensioning member.

It is achieved thereby that with a lengthening of the chain, the coordination of the aggregates driven from the crankshaft remains constant with close approximation because the chain geometry does not change or changes only within negligible limits as a result of the movement of the further tensioning member.

The arrangement of the second tensioning member is appropriately in the pulling section of the chain between the driving wheel and the wheel with which an exact coordination is most important. The construction is thereby to be such that the tensioning member completely compensates the chain lengthening up to this wheel. If several wheels or gears are provided with which the coordination to the driving chain wheel or sprocket is of particular importance, then also the arrangement of several additional tensioning members is possible. Their tensioning travel must be so constructed by the selection of the transmission ratio that in each case the chain lengthening to the preceding tensioning member or with the last tensioning member to the driving wheel or gear is completely compensated.

In order to prevent a return movement of this tensioning member engaging at the pulling chain section, the tensioning movement of the further tensioning member may be adapted to be blocked in a direction opposite the tensioning movement direction by a unilaterally and automatically acting locking means.

Therebeyond, the further tensioning member may be additionally elastically prestressed in the tensioning direction. As a result of the elastic prestress, the largest part of the chain pull acting on the tensioning member is compensated, whence the chain tensioning device in the loose or slack section of the chain does not have to be dimensioned considerably stronger in order to displace also the further tensioning member.

Furthermore, the tensioning movement of the second tensioning member may be derived directly mechanically from the first tensioning member. As a result thereof, the overall conception is considerably simplified and rendered less costly. However, according to the present invention, the tensioning movement can also be picked up from the first tensioning member and may be transmitted onto the second tensioning member by pneumatic, hydraulic or electromagnetic means.

Moreover, the spring effecting the elastic prestress for the tensioning member may engage at an intermediate member deriving and mechanically transmitting the tensioning movement for the second tensioning member.

Therebeyond, the further tensioning member may be arranged in the chain section returning from the driven wheel which is most sensitive as regards an accurate coordination with respect to phase.

Finally, further tensioning members may engage at a chain section arranged between two driven wheels or gears.

Accordingly, it is an object of the present invention to provide a chain drive, especially for the timing control of internal combustion engines which avoids by simple means the aforementioned shortcomings and drawbacks encountered with the prior art arrangements.

Another object of the present invention resides in a chain drive, especially for the control drive of internal combustion engines which compensates for any lengthening that may occur in the chain.

A further object of the present invention resides in a chain drive, especially for the control drive of internal combustion engines, in which an undesired change of the coordination of the aggregates driven from the crankshaft is precluded notwithstanding any change in the length of the chain.

A still further object of the present invention resides in a chain drive which assures extraordinarily uniform control periods in internal combustion engines notwithstanding thermal expansions in the engine and/or oscillations or vibrations of the chain.

Another object of the present invention resides in a chain drive which keeps the coordination of the control periods of the valves and of the ignition or injection instant as constant as possible over the length of life of an internal combustion engine.

These and other objects, features and advantages of the present invention will become more apparent from the following description when taken in connection with the accompanying drawing which shows, for purposes of illustration only, two embodiments in accordance with the present invention, and wherein:

FIG. 1 is a schematic view of a chain drive according to the present invention for an internal combustion engine with two cam shafts, for example, a V-engine;

FIG. 2 is a partial cross-sectional view, on an enlarged scale, through the automatic blocking device of the further tensioning member in accordance with the present invention; and FIG. 3 is a schematic view of a chain drive according to the present invention for an internal combustion engine with a single cam shaft, for example, an in-line engine.

Referring now to the drawing wherein like reference numerals are used throughout the various views to designate like parts, a chain drive is illustrated in FIG. 1, in which a chain 1, driven by the crankshaft 2 of an internal combustion engine, drives two cam shafts 3 and an ignition distributor or an injection pump 4. The loose or slack section 1' is tensioned by a tensioning member 6 (tensioning rail) rotatably supported about a shaft 5, which is pressed against the chain 1 by a tensioning device (not shown) of conventional construction. The tensioning rail 6 carries a cam 7 which acts on a bell crank 9 rotatably supported about a pivot shaft 8. The bell crank 9 engages with one end 10 behind a shaft 11 of a further tensioning member 12 and presses the same against a further chain section 1''. The tensioning member 12 is supported in a fork 13 (FIGS. 1 and 2) which is displaceably arranged with the shank 14 in a slide guidance 15. Ring-shaped saw-tooth-like recesses 17 (FIG. 2) are provided at the end 16 of the shank 14, into which a detent spring 18 supported in the slide guidance 15 engages and thereby blocks a return movement of this further tensioning member 12 acting on the pulling section of the chain 1.

A spring 19 always holds the bell crank 9 and therewith the further tensioning member 12 with prestress against the chain section 1''. If the tensioning rail 6 now moves as a result of the chain lengthening, then the tensioning member 12 is also pressed thereby against the chain by way of the bell crank 9 and the displacement of the coordination with a chain lengthening is compensated for by the longer path of the chain.

An arrangement is shown in FIG. 3, in which the tensioning rail 6 presses directly on the shank 14 of the tensioning member 12 without mechanical intermediate member.

Of course, the arrangement of the tensioning members 6 and 12 according to the present invention is also applicable to a corresponding construction for tooth grip belts and other looping drives.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A timing control chain drive of an internal combustion engine which includes one driving chain wheel and at least two driven chain wheels with a drive chain passing around the driving and driven chain wheels, and a first chain tensioning means engaging at a non-loaded section of the drive chain, characterized in that a further chain tensioning means is provided which engages at another section of the drive chain, and in that means are provided for operatively connecting the first and further chain tensioning means whereby a tensioning movement of the further tensioning means is derived from the first tensioning means.

2. A timing control chain drive according to claim 1, characterized in that a unilaterally and automatically operating blocking means is provided for blocking the tensioning movement of th further chain tensioning means in a direction opposite the tensioning movement direction.

3. A timing control chain drive according to claim 2, characterized in that means are provided for additionally elastically prestressing the further tensioning means in the tensioning direction.

4. A timing control chain drive according to claim 3, characterized in that the means for operatively connecting the first and further chain tensioning means includes means for directly mechanically deriving the tensioning movement from the first chain tensioning means.

5. A timing control chain drive according to claim 3, characterized in that the means for operatively connecting the chain tensioning means includes an intermediate member disposed between the first chain tensioning means and the further chain tensioning means for deriving and mechanically transmitting the tensioning movement to the further chain tensioning means, the prestressing means includes a spring engaging at the intermediate member.

6. A timing control chain drive according to claim 3, characterized in that the further chain tensioning means is arranged in a section of the drive chain which returns from a driven chain wheel that is most sensitive as regards an accurate phase coordination.

7. A timing control chain drive, comprising first chain tensioning means engaging at a non-loaded chain section, characterized in that a further chain tensioning means is provided which engages at another chain section, the tensioning movement of the further tensioning means being derived from the first tensioning means, the tensioning movement of the further tensioning means is operable to be blocked in a direction opposite the tensioning movement direction by a unilaterally and automatically operating blocking means, the further tensioning means is additionally elastically prestressed in the tensioning direction, the further tensioning means is arranged in the section of the chain which returns from a given wheel that is most sensitive as regards an arcuate phase coordination, and in that the further tensioning means engages at a chain section arranged between two driven wheels.

8. A chain drive according to claim 6, characterized in that said further tensioning means includes several tensioning members engaging at different chain sections.

9. A chain drive according to claim 7, characterized in that the tensioning movement of the further tensioning means is derived directly mechanically from the first tensioning means.

10. A chain drive according to claim 7, characterized in that a spring effecting the elastic prestress for the further tensioning means engages at an intermediate member deriving and mechanically transmitting the tensioning movement for the further tensioning means.

11. A timing control chain drive according to claim 1, characterized in that means are provided for additionally elastically prestressing the further tensioning means in the tensioning direction.

12. A timing control chain drive according to claim 1, characterized in that the means for operatively connecting the first and further chain tensioning means includes means for directly mechanically deriving the tensioning movement from the first chain tensioning means.

13. A timing control chain drive according to claim 1, characterized in that the means for operatively connecting the chain tensioning means includes an intermediate member disposed between the first and further chain tensioning means for deriving and mechanically transmitting the tensioning movement to the further chain tensioning means, a spring means is provided for effecting an elastic prestress of the further tensioning means, said spring means engages at the intermediate member deriving and mechanically transmitting the tensioning movement to the further chain tensioning means.

14. A timing control chain drive according to claim 1, characterized in that the further chain tensioning means is arranged in a section of the drive chain which returns from a driven wheel that is most sensitive as regards an accurate phase coordination.

15. A timing control chain drive, comprising first chain tensioning means engaging at a non-loaded chain section, characterized in that a further chain tensioning means is provided which engages at another chain section, the tensioning movement of the further tensioning means being derived from the first tensioning means, and in that the further tensioning means engages at a chain section arranged between two driven wheels.

16. A timing control chain drive according to claim 1, characterized in that said further tensioning means includes several tensioning members engaging at different sections of the drive chain.

* * * * *